VARACTOR SCAN CIRCUIT WITH SCAN PREVENTION CIRCUITRY DURING BRIEF SIGNAL FADES

Filed Feb. 29, 1968

INVENTOR:
JOSEPH A. WORCESTER,
BY W. S. Wolfe
HIS ATTORNEY.

United States Patent Office 3,559,076
Patented Jan. 26, 1971

3,559,076

VARACTOR SCAN CIRCUIT WITH SCAN PREVENTION CIRCUITRY DURING BRIEF SIGNAL FADES

Joseph A. Worcester, Frankfort, N.Y., assignor to General Electric Company, a corporation of New York Filed Feb. 29, 1968, Ser. No. 709,275
Int. Cl. H04b *1/32*
U.S. Cl. 325—470 4 Claims

ABSTRACT OF THE DISCLOSURE

An automatically tuned radio receiver having a frequency determining circuit including a reactive element, the capacitance of which varies with the potential applied across it. The reactive element is coupled to a capacitor network which is charged by a source connected to a control circuit comprising first and second serially connected transistors. In the absence of a received signal, the transistors conduct, and the capacitor charges. When a signal is received, it is applied to the control electrodes of the first and second transistors to turn the transistors off, so that the receiver remains tuned to the frequency of the incoming signal. Should the signal be temporarily lost, the signal is removed from the control electrodes of the transistors. However, an R-C circuit connected to the control electrode of the second transistor holds the transistor non-conductive for the duration of the R-C circuit time constant.

BACKGROUND OF THE INVENTION

A "varactor" is a reverse biased semiconductor diode that has been processed for high junction capacitance. The capacitance between the terminals of the varactor varies widely with applied voltage and device can accordingly be employed as a voltage variable capacitor.

Incorporation of varactors in scan tuned radio receivers eliminates the need for the drive motors utilized in the prior art to turn the rotor portions of conventional mechanically variable capacitors. A varactors circuit requires a smaller power supply than do such motor drives, and no moving parts are required.

In varactor scan tuning, a varactor is included in the selection circuitry of a radio receiver, the potential applied to the varactor determining the frequency to which the receiver is tuned. The receiver frequency band is scanned by varying the varactor potential over a predetermined range. This is accomplished by connecting the varactor across a scan capacitor which is charged between a predetermined first potential and a higher second potential. When the receiver is tuned to a station, a DC signal is delivered from the receiver IF stage to a control device to open the connection between the scan capacitor and the charging source. The potential applied to the varactor thus remains at the level required to tune the receiver to the station.

However, in the prior art circuits if the signal is lost even momentarily, the control signal is also lost. The capacitor thus resumes charging and the receiver continues scanning. This is particularly disadvantageous in a portable radio receiver where a signal may be momentarily lost simply due to a loop null when the position of the receiver is changed. When this occurs, the listener must tune the receiver to regain the desired station.

It is, therefore, an object of the present invention to provide a radio receiver including a varactor scan circuit in which the potential applied to a varactor is held at an existing value for a predetermined period of time after an incoming signal is lost.

SUMMARY OF THE INVENTION

Briefly stated, in accordance with the present invention, there is provided a radio receiver including a varactor scan circuit having a pair of control devices connected serially between a source of charging potential and a scan capacitor across which a varactor is connected. The control devices may conveniently be transistors, which when conducting connect the charging source to the capacitor. When the receiver receives a signal from a station, a control signal is applied to the control devices to open the connection between the charging source and the scan capacitor. An R-C circuit is connected to one control device to maintain the device in a non-conductive state after the control signal is lost, so that the receiver will not resume scanning the band for a period of time determined by the time constant of the R-C circuit.

BRIEF DESCRIPTION OF THE DRAWINGS

The novel features of the present invention are pointed out with particularity in the appended claims. The present invention, both as to its organization and manner of operation, as well as its best mode of operation, may be further understood by reference to the following description, taken in connection with the following drawings.

Of the drawings.

DESCRIPTION OF THE PREFERRED EMBODIMENT

Figure 1:
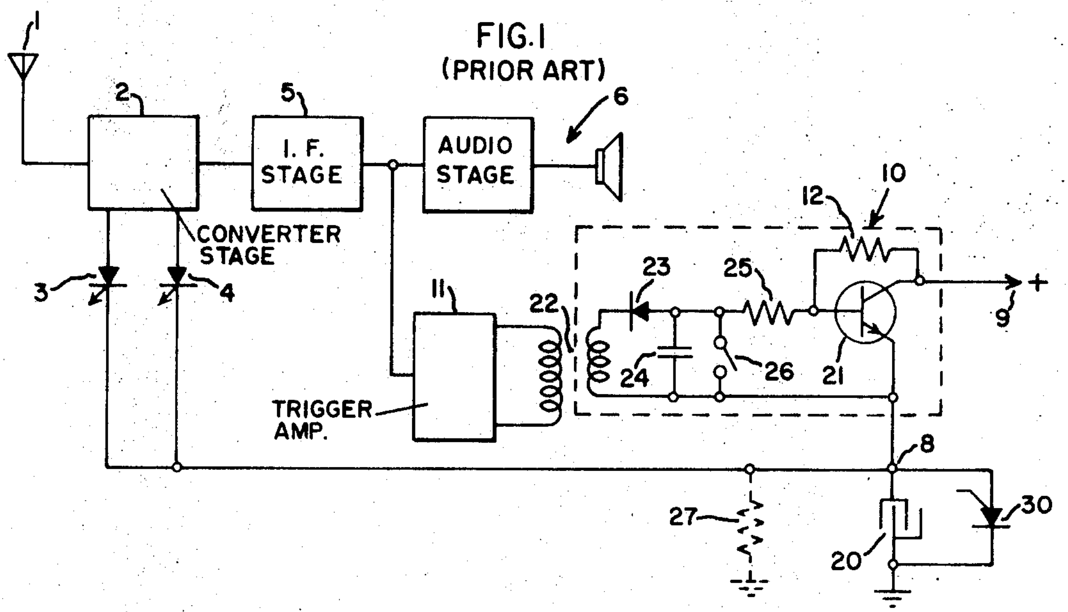
FIG. 1 (PRIOR ART)
FIG. 1 is a schematic representation of a prior art varactor scan circuit.

The improvement of the present invention may be best understood by first referring to FIG. 1, which illustrates a prior art varactor scan circuit in a superheterodyne receiver. An incoming signal is received by antenna 1 and coupled to autodyne converter circuit 2. The autodyne converter stage is a combination of a local oscillator, mixer, and intermediate frequency amplifier. The antenna circuitry associated with antenna 1 is tuned by varactor 3 in well-known fashion, and the frequency of the oscillation of the oscillator included in converter stage 2 is determined by varactor 4 also in well-known fashion. The output of converter stage 2 is coupled to intermediate frequency stage 5, which delivers an input to detector and audio output stage 6.

Varactor scan circuits may also be included in other types of receivers in which it is desired to vary the capacitance of an element over a predetermined range. For example, in the type of superheterodyne receiver where an autodyne converter is not employed a single varactor may be included in a separate local oscillator operating in conjunction with a mixer stage coupled to a broad band antenna.

Scanning is accomplished by varying the potential applied across varactors 3 and 4 from a predetermined first potential to a relatively higher second potential. Varactors 3 and 4 are connected in common to terminal 8 of scan capacitor 20 so that the potential to which capacitor 20 is charged is applied across varactors 3 and 4, the circuit being completed to the other terminal of the scan capacitor through the circuitry of converter 2 and ground in well-known fashion. In this manner, the varactors 3 and 4 are connected in parallel with the scan capacitor 20. The scan capacitor 20 is preferably a large value electrolytic capacitor. As the capacitor 20 charges, the potential applied across varactors 3 and 4 is varied over a predetermined range. As the applied potential increases, the capacitance of the varactors decreases, and the receiver is tuned to successively higher frequencies.

Each applied potential corresponds to a particular received frequency.

A voltage controlled breakdown device 30 is connected across capacitor 20. The device 30 may conveniently be a unijunction transistor connected as shown. The breakdown voltage of the device 30 is the same voltage as that required across the scan capacitor 20 to tune the receiver to the highest frequency to be received. When the potential applied to the capacitor 20 reaches the breakdown voltage of the device 30, capacitor 20 discharges through the breakdown device. The breakdown device 30 then conducts until the capacitor 20 discharges to substantially ground potential, and the receiver scanning recommences.

The charging potential is supplied by source 9, and the charging of the capacitor 20 is controlled by control circuit 10 and trigger amplifier 11. The charging source 9 is connected to the collector of a transistor 21, the emitter of which is connected to terminal 8 of capacitor 20. A biasing resistor 12 is connected between the base of transistor 21 and source 9 so that transistor 21 is normally conductive thereby connecting the source 9 to scan capacitor 20.

In order to understand the operation of the circuit of FIG. 1, it is easiest to initially assume that terminal 8 of the capacitor 20 is at substantially ground potential. As capacitor 20 charges and the potential at terminal 8 increases, the receiver scans the radio frequency band. When a signal is encountered by the receiver, converter stage 2 delivers an output to intermediate frequency stage 5, and the signal is passed to a trigger amplifier 11. The trigger amplifier is essentially an IF amplifier having a very narrow bandwidth on the order of 200–500 hertz. The narrow band IF output of trigger amplifier 11 is coupled by transformer 22 to a detector comprising diode 23 in conjunction with capacitor 24 and resistor 25. The output of the detector 23 is a DC control signal which is applied to the base of transistor 21 to bias the transistor 21 to a non-conducting state upon reception of a signal from a station so that the charging voltage is removed from the scan capacitor 20 and scanning ceases at that time.

As long as a signal is delivered from the converter circuit to the trigger circuit 11, the transistor remains non-conducting, and the radio remains tuned to the frequency of the incoming signal. When the charge on capacitor 20 tends to decrease by leakage through various leakage paths as indicated by resistor 27, the potential on varactors 3 and 4 also tends to decrease. However, at that time, charging of scan capacitor 20 recommences to maintain capacitor 20 at the potential level necessary to tune to the incoming signal.

When it is desired to tune to the next station in the band, switch 26 is closed to remove the control signal from the base of transistor 21. When the control signal is removed, the transistor 21 again becomes conductive and charging of capacitor 20 resumes.

However, should the incoming signal disappear even momentarily, the control signal produced by trigger amplifier 11 is lost, and the bias applied to the base of transistor 21 to render it non-conducting is lost, so that the transistor resumes scanning and the incoming signal is lost. This may easily happen, for example, in a portable radio where the position of the radio is changed such that the signal of a desired station is lost due to an antenna loop null. The undesired resumption of receiver scanning may result in considerable inconvenience to the receiver operator and, in a portable receiver, may cause severe difficulty in tuning to a particular station.

Figure 2:
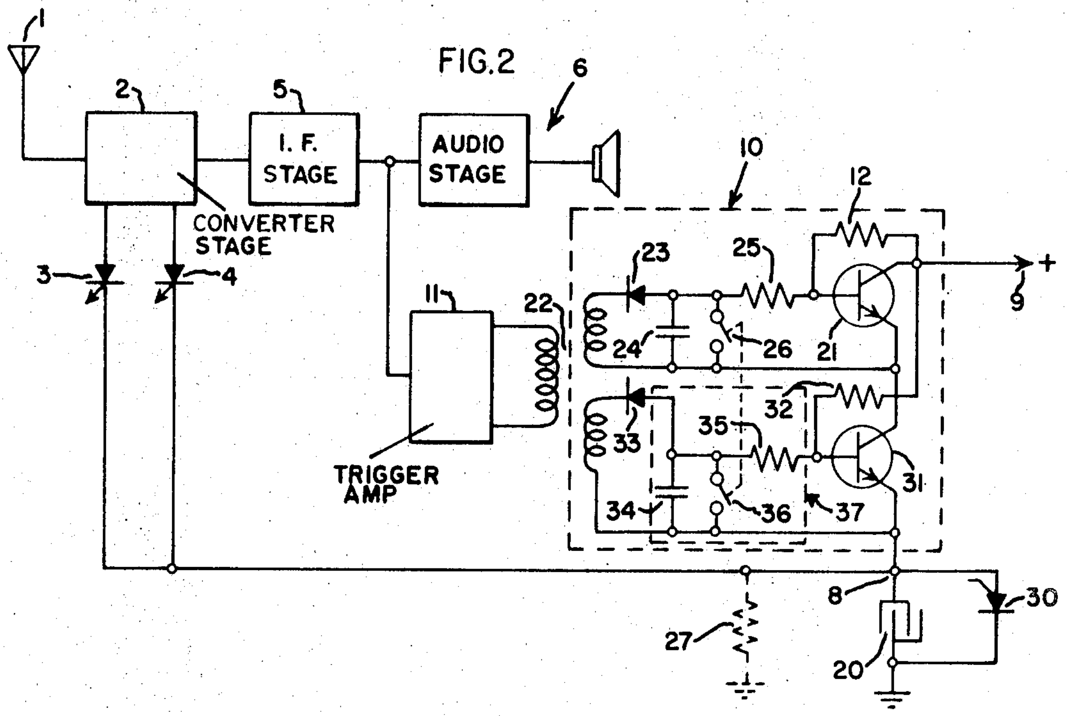
FIG. 2 is a schematic representation of varactor scan circuit constructed in accordance with the present invention.

The receiver shown in FIG. 2 includes a control circuit which causes the receiver to remain tuned to an incoming signal for a predetermined period of time even if the signal is temporarily lost. The same reference numerals are used to denote elements which correspond to and perform the same function as elements included in the circuit illustrated in FIG. 1.

In the circuit shown in FIG. 2, the control circuit 10 further includes a second transistor 31 having its collector connected to the emitter of transistor 21 and its emitter connected to terminal 8 of capacitor 20 so that the transistor 31 is connected in series with transistor 21. A biasing resistor 32 is connected between the source 9 and the base of transistor 31 so that transistor 31 is normally conducting in the same manner as transistor 21. When an incoming signal is encountered, the trigger amplifier 11 produces an output which is coupled by transformer 22 to both diode 23 and 33 to apply a control signal to the bases of transistors 21 and 31 respectively.

Connected to the base of transistor 31 is an R-C holding circuit 37 comprising capacitor 34, connected across diode 33, and resistor 35 connected between diode 33 and the base of transistor 31. The values of capacitor 34 and resistor 35 are chosen so that the R-C circuit 37 has a large time constant on the order of, for example, 1 to 5 seconds. For this purpose, capacitor 34 is preferably an electrolytic capacitor.

When the incoming signal is lost, the control signal is removed from the base of transistor 31 and also from the base of transistor 21, which results in conduction of transistor 21. However, R-C circuit 37 supplies potential to the base of transistor 31 to hold the transistor in a non-conducting state for a desired period of time determined by its time constant. Consequently, the connection between charging source 9 and scan capacitor 20 remains open, so that the receiver is prevented from further scanning of the waveband until circuit 37 discharges sufficiently to allow transistor 33 to conduct.

Scan switch 36 is connected across the diode 33 and may be ganged with switch 26 so that control signals produced when an incoming signal is encountered may be removed from the base of transistors 21 and 31 when it is desired to continue scanning of the receiver waveband.

Thus, the transistor 21 in conjunction with the detector comprising diode 23, capacitor 24 and resistor 26 serves to nearly instantaneously interrupt the charging of the scan capacitor 20 when a station signal is received while the transistor 31 in conjunction with the holding circuit comprising diode 33, capacitor 34 and resistor 35 serves to delay the resumption of charging of the scan capacitor when the station signal is momentarily lost.

Many modifications may be made in the specific circuit details of this invention without departing from the scope thereof as defined in the appended claims.

What is claimed is:

1. In an automatically tuned radio receiver having a selection circuit including a reactive element, the capacitance of which varies with the potential applied thereacross, a scan capacitor connected to said reactive element, a potential source for charging said scan capacitor, a first control device connected in series with said source and said scan capacitor for conducting the current supplied by said source to said capacitor, and means coupled between said selection circuit and said first control device for generating and applying a control signal for rendering said control device non-conducting when said selection circuit is tuned to an incoming signal, the improvement comprising:

(a) a second control device connected in series with said first control device, said second control device being connected in series between said source and said capacitor;

(b) coupling means for coupling said control signal to said second control device; and (c) a holding circuit connected between said coupling means and said second control device for maintaining said second control device in a non-conducting state for a predetermined period of time after the cessation of a control signal.

2. The improvement recited in claim 1 in which said first and second control devices comprise transistors.

3. The improvement recited in claim 2 in which said holding circuit comprises an R-C holding circuit.

4. In a superheterodyne receiver having a signal selection stage including first and second varactors, a scan capacitor connected across said first and second varactors, a source of potential for charging said scan capacitor, a first normally conducting transistor having its emitter-collector circuit connected in series with said source and said scan capacitor, a trigger amplifier coupled to said signal selection stage for producing a control signal when said signal selection stage is tuned to an incoming signal, means coupling said control signal to the base of said first transistor to render said first transistor non-conductive, the improvement comprising:

(a) a second normally conducting transistor having its emitter-collector circuit connected in series with the emitter-collector circuit of said first transistor between said source and said capacitor;

(b) means coupling said control signal to the base of said second transistor; and (c) an R-C holding circuit connected to the base of said second transistor for maintaining said second transistor in a non-conducting state for a predetermined period of time after the cessation of a control signal.

References Cited

UNITED STATES PATENTS 3,447,087 5/1969 Takezaki et al. ______ 325—422

ROBERT L. GRIFFIN, Primary Examiner

B. V. SAFOUREK, Assistant Examiner

U.S. Cl. X.R.

325—319, 468; 334—14